US008166720B2

(12) United States Patent
Garrigus et al.

(10) Patent No.: US 8,166,720 B2
(45) Date of Patent: May 1, 2012

(54) ROOFING MEMBRANE RETAINER

(75) Inventors: Peter C. Garrigus, Bryan, OH (US); Pat Parziale, Elyria, OH (US)

(73) Assignee: Talan Products, Cleveland, OH (US)

( * ) Notice: Subject to any disclaimer, the term of this patent is extended or adjusted under 35 U.S.C. 154(b) by 819 days.

(21) Appl. No.: 11/971,748

(22) Filed: Jan. 9, 2008

(65) Prior Publication Data
US 2009/0173028 A1 Jul. 9, 2009

(51) Int. Cl.
*E04B 5/00* (2006.01)
(52) U.S. Cl. ............................................. 52/410; 52/408
(58) Field of Classification Search ................ 52/410, 52/408, 512; 411/545
See application file for complete search history.

(56) References Cited

U.S. PATENT DOCUMENTS

| | | |
|---|---|---|
| 1,435,134 A | 11/1922 | Boley |
| 2,334,406 A | 11/1943 | Gray |
| 4,361,997 A | 12/1982 | DeCaro |
| 4,380,413 A | 4/1983 | Dewey |
| 4,455,804 A | 6/1984 | Francovitch |
| 4,467,581 A | 8/1984 | Francovitch |
| 4,476,660 A | 10/1984 | Francovitch |
| 4,520,606 A | 6/1985 | Francovitch |
| 4,630,984 A | 12/1986 | Reinwall et al. |
| 4,631,433 A | 12/1986 | Stokes |
| 4,641,472 A | 2/1987 | Young et al. |
| 4,726,164 A | 2/1988 | Reinwall et al. |
| 4,744,187 A | 5/1988 | Tripp |
| 4,757,661 A | 7/1988 | Hasan |
| 4,763,456 A | 8/1988 | Giannuzzi |
| 4,787,188 A | 11/1988 | Murphy |
| 4,803,823 A | 2/1989 | Stenson |
| 4,900,208 A | 2/1990 | Kaiser et al. |
| 4,945,699 A | 8/1990 | Murphy |
| 4,987,714 A | 1/1991 | Lemke |
| 5,018,329 A | 5/1991 | Hasan et al. |
| 5,069,589 A | 12/1991 | Lemke |
| 5,102,275 A | 4/1992 | Hulsey |
| 5,217,339 A | 6/1993 | O'Connor et al. |
| 5,255,485 A | 10/1993 | Lemke et al. |
| 5,267,423 A | 12/1993 | Giannuzzi |
| 5,378,102 A | 1/1995 | Mossman |
| 5,709,059 A | 1/1998 | Murphy et al. |
| 5,803,693 A | 9/1998 | Choiniere et al. |
| 5,882,043 A | 3/1999 | Murphy et al. |
| 5,915,903 A | 6/1999 | Osterle et al. |
| 5,930,969 A | 8/1999 | Mayle et al. |
| 5,951,225 A | 9/1999 | Osterle et al. |
| 6,095,737 A | 8/2000 | Barker et al. |

(Continued)

FOREIGN PATENT DOCUMENTS

CH 635907 4/1983

(Continued)

*Primary Examiner* — Basil Katcheves
(74) *Attorney, Agent, or Firm* — Wells St. John P.S.

(57) ABSTRACT

A roofing membrane retainer is provided having a cylindrical plate. The cylindrical plate has a central aperture for receiving a fastener. The plate also includes a pair of concentric inner and outer raised reinforcing ribs and a plurality of scoop-shaped projections. The scoop-shaped projections extend downwardly from the plate in concentric inner and outer cylindrical arrays. The inner cylindrical array of projections and the outer cylindrical array of projections are radially outward of the inner rib and the outer rib, respectively. The projections each comprise a scoop with a base periphery having an open mouth edge and a remaining peripheral portion contiguous with the plate. The projections in each array are spaced equidistance about the plate. The mouth edge of adjacent projections are oriented in alternating radial inward and outward directions.

29 Claims, 5 Drawing Sheets

U.S. PATENT DOCUMENTS

| | | |
|---|---|---|
| 6,205,730 B1 | 3/2001 | Hasan et al. |
| 6,233,889 B1 | 5/2001 | Hulsey |
| 6,250,034 B1 | 6/2001 | Hulsey |
| D446,319 S | 8/2001 | Rubenacker |
| 6,282,857 B1 | 9/2001 | Rubenacker |
| 6,665,991 B2 | 12/2003 | Hasan |
| 7,631,468 B2 | 12/2009 | Gong et al. |
| 2003/0033780 A1 | 2/2003 | Hasan |
| 2003/0126816 A1 | 7/2003 | Hasan et al. |
| 2004/0148888 A1 | 8/2004 | Kuhn et al. |
| 2006/0185289 A1 | 8/2006 | Gong et al. |

FOREIGN PATENT DOCUMENTS

| | | |
|---|---|---|
| DE | 85253588 | 1/1986 |
| FR | 1362380 | 4/1964 |
| GB | 2027786 | 2/1980 |
| NL | 7700937 | 1/1977 |

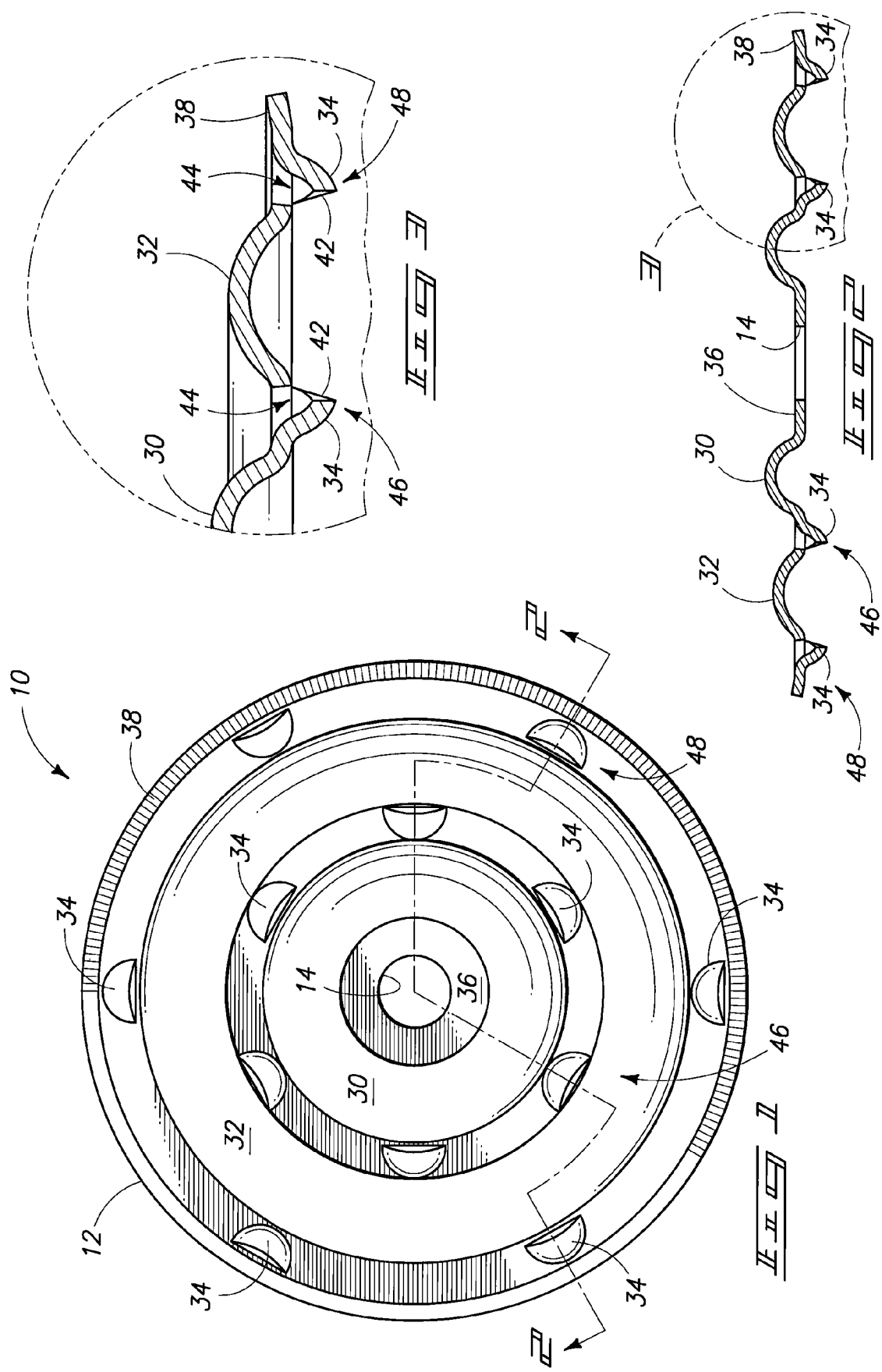

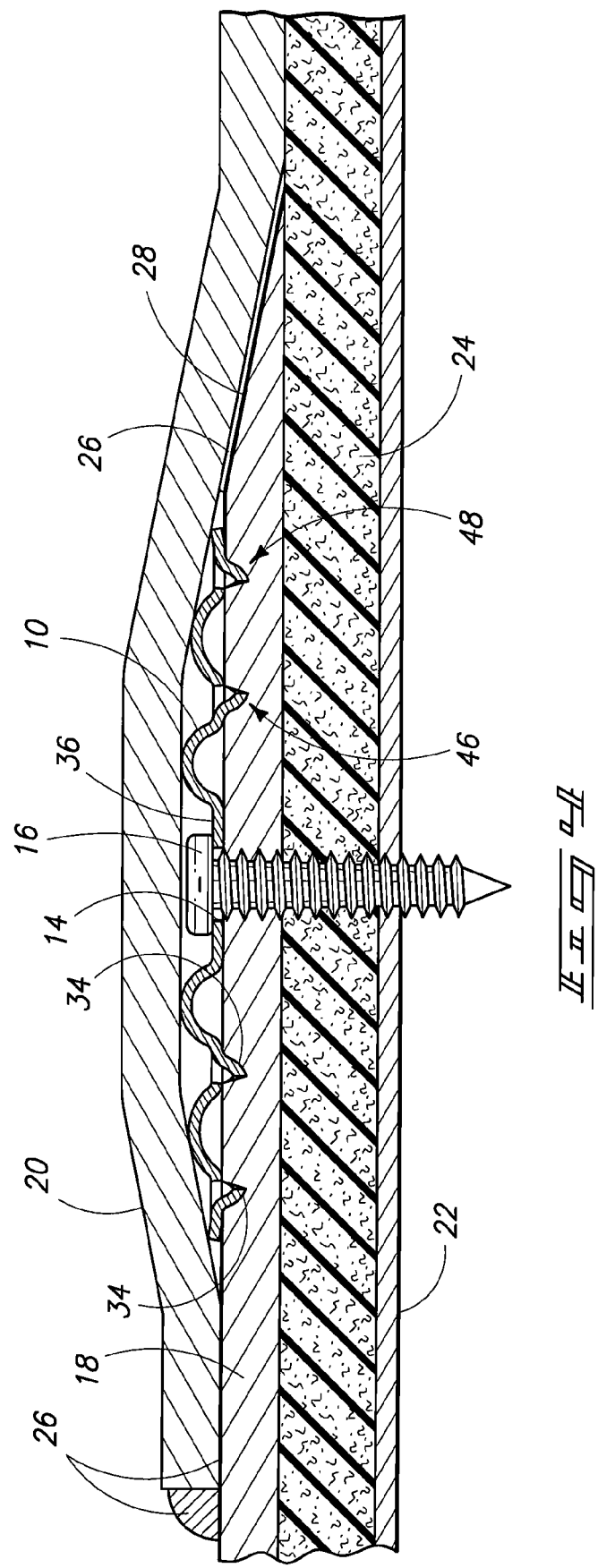

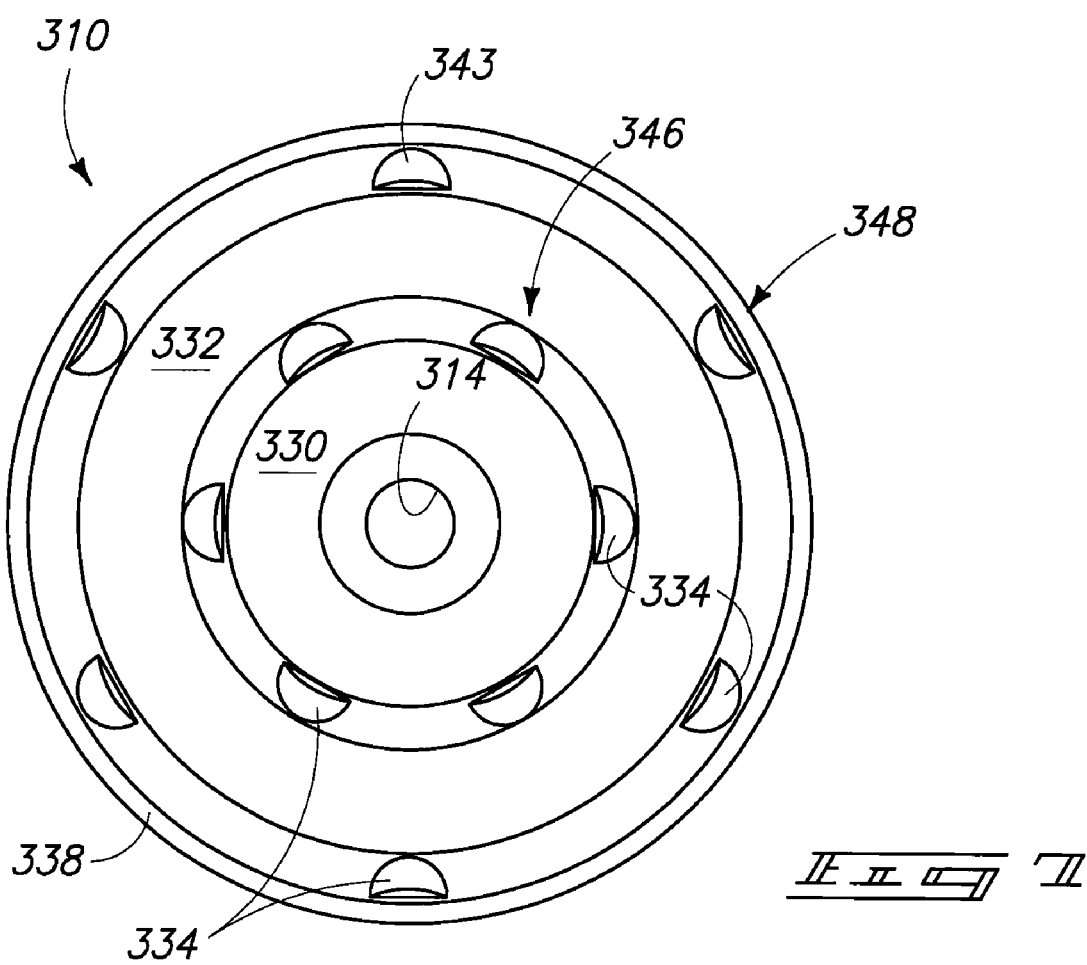

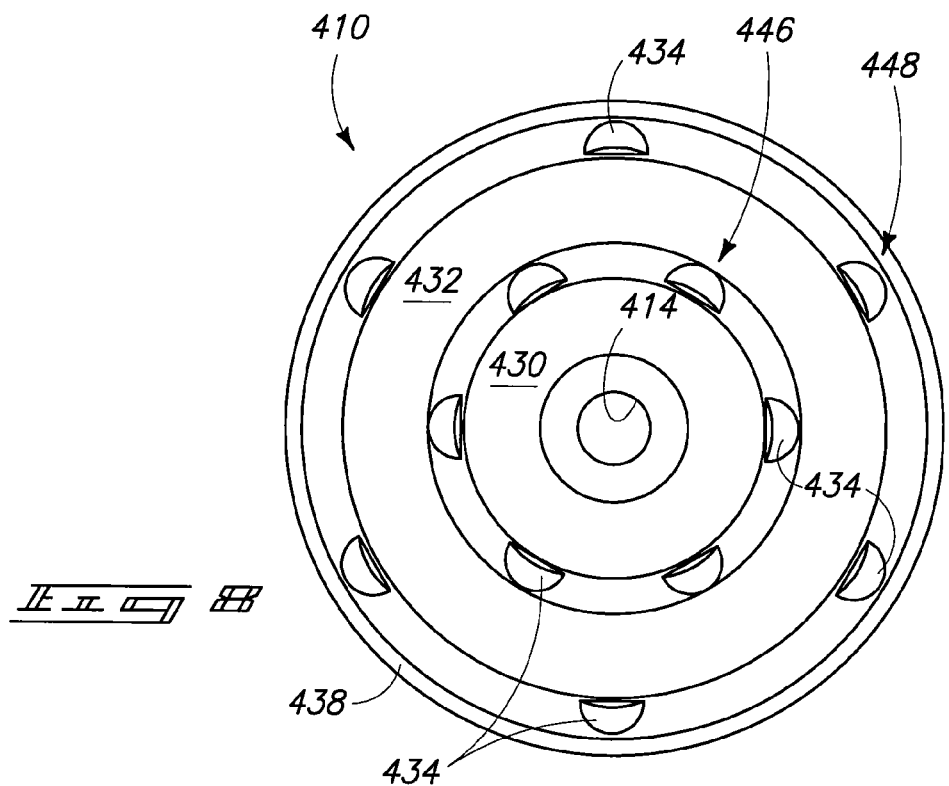
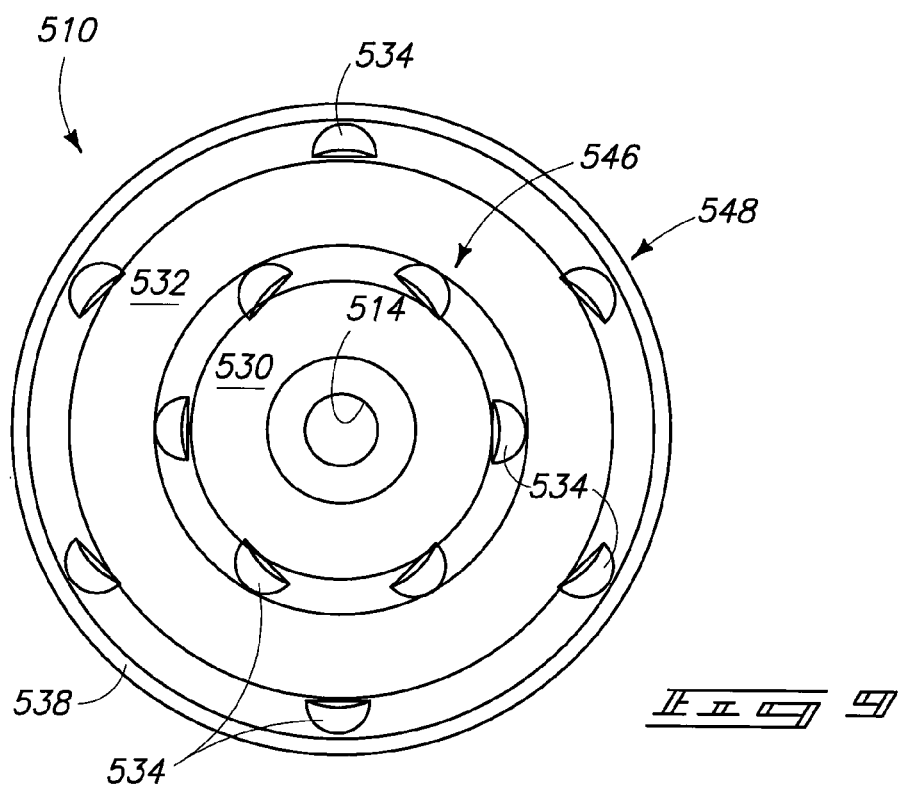

ROOFING MEMBRANE RETAINER

TECHNICAL FIELD

This invention pertains to retention and connection systems for roof decking membranes. More particularly, the present invention relates to roofing membrane retainers and seam plates.

BACKGROUND OF THE INVENTION

It is well known to use roofing membrane retainers, or seam plates in order to retain roof decking membranes atop roof decking substructures. More particularly, roof decking membranes are of limited width relative to a roof structure, necessitating placement of membranes adjacent or in overlapping arrangement. These constructions are well-known in the art. U.S. Pat. No. 4,945,699 to Murphy illustrates one roofing seam plate suitable for retaining membranes atop a roof decking substructure. Typically, an insulation layer is placed atop a steel roof decking structure, after which membranes are rolled thereatop. A seam plate is applied along the membrane edge with a screw fastener, driving the screw through the insulation panel and into the decking to retain an edge of the membrane therealong. Subsequently, an adjacent membrane edge is adhesively applied over the edge of the adjacent membrane where the seam plate has been applied to the first membrane, completely covering over the seam plate. The construction provided in U.S. Pat. No. 4,945,699 includes a plurality of circumferentially spaced apart prongs or tangs that terminate in a sharp gripping point. The prongs grip the underlying membrane, thereby preventing it from loosening or freeing with respect to the seam plate or the insulation and decking structure provided therebelow. Hence, the membrane and insulation panel are retained by the seam plate and fastener to the underlying steel roof decking despite wind loading to the roof structure that might otherwise raise or rip the membrane and insulation from the roof decking. However, the presence of sharp prongs on a seam plate tends to increase the likelihood that the roofing membrane will puncture or tear when subjected to wind loads or other in-use loads. Secondly, the prongs on such seam plates make installation more difficult as roofing installers retrieve by hand individual seam plates from within a container, or bucket and the prongs tend to cut and abrade their fingers and hands.

Similarly, the seam plate of U.S. Pat. No. 6,665,991 to Hasan utilizes downwardly extending v-shaped projections that each form a pair of side legs at an included angle of 90 degrees. Each v-shaped projection has a corner or apex portion formed at the intersection of the legs. Such v-shaped configuration has two severed edges, one on either side of the v-shaped configuration. Accordingly, two sharp points are still provided by each projection at the corner. Such points tend to increase the likelihood that a membrane will be torn under severe loading conditions which can lead to failure of the fastening system and tearing of the membrane. Secondly, the two corners on each v-shaped projection can also lead to undesirable cutting and abrading of the hands of a roofing installer.

Accordingly, improvements are needed for seam plates and roofing membrane retainers in order to increase the ability of the retainers to grip roofing membranes when subjected to significant loading conditions, while reducing the likelihood that tears and punctures will propagate through the membrane under such loading conditions. Secondly, improvements are needed in order to reduce the likelihood that installers will cut and abrade their hands while retrieving and handling such retainers during an installation operation.

SUMMARY OF THE INVENTION

A roofing membrane retainer, or seam plate is provided with an array of projections that grip roofing membranes while under sheet tension loads in all directions without imparting undue risk of puncture to the membranes from such loads.

According to one aspect, a roofing membrane retainer is provided having a cylindrical plate. The cylindrical plate has a central aperture for receiving a fastener. The plate also includes a pair of concentric inner and outer raised reinforcing ribs and a plurality of scoop-shaped projections. The scoop-shaped projections extend downwardly from the plate in concentric inner and outer cylindrical arrays. The inner cylindrical array of projections and the outer cylindrical array of projections are radially outward of the inner rib and the outer rib, respectively. The projections each comprise a scoop with a base periphery having an open mouth edge and a remaining peripheral portion contiguous with the plate. The projections in each array are spaced equidistance about the plate. The mouth edge of adjacent projections are oriented in alternating radial inward and outward directions.

According to another aspect, a roofing membrane seam plate is provided having a plate. The plate has a closed curve outer periphery with a central aperture sized to receive a fastener. The plate includes a pair of circumferentially extending inner and outer raised reinforcing ribs and a plurality of obtuse projections. The obtuse projections extend downwardly from the plate in inner and outer circumferential arrays. Each projection includes a scoop with a peripheral portion contiguous with the plate and an open mouth edge separated from the plate. The inner circumferential array of projections and the outer circumferential array of projections are provided radially outward of the inner rib and the outer rib, respectively. The projections in each array are spaced equidistance about the plate. The mouth edge of adjacent projections within the inner array and the outer array are oriented in alternating radial inward and outward directions.

According to yet another aspect, a roofing membrane retainer is provided having a plate. The plate has a central aperture for receiving a fastener. The plate includes a pair of concentric inner and outer raised reinforcing ribs and a plurality of scoop-shaped projections. The projections extend downwardly from the plate in concentric inner and outer circumferential arrays. The inner circumferential array of projections and the outer circumferential array of projections are radially outward of the inner rib and the outer rib, respectively. The projections each comprise a scoop with a base periphery having an open mouth edge and a remaining peripheral portion contiguous with the plate. The projections in each array are spaced equidistance about the plate. The mouth edge of at least three adjacent projections in each array is oriented in alternating radial inward and outward directions.

According to yet another aspect, a roofing membrane retaining washer is provided having a cylindrical plate with a central aperture configured to receive a fastener. The plate includes an inner reinforcing rib, an outer reinforcing rib, a plurality of projections and an upturned outer peripheral edge portion. The plurality of projections each extend downwardly from the plate and are configured in concentric inner and outer cylindrical arrays. Each projection includes a free-edge axisymmetric shell structure.

BRIEF DESCRIPTION OF THE DRAWINGS

Preferred embodiments of the invention are described below with reference to the following accompanying drawings.

FIG. 1 is a top plan view of a roofing membrane retainer according to one aspect of the present invention.

FIG. 2 is a cross-sectional view of the roofing membrane retainer of FIG. 1 taken along line 2-2 of FIG. 1.

FIG. 3 is an enlarged cross-sectional view taken from the encircled region 3 of FIG. 2.

FIG. 4 is a cross-sectional view of a roof decking system illustrating use of the roofing membrane retainer of FIGS. 1-3 along a seamed location of two overlapping membrane sheets as secured atop a roof decking substructure.

FIG. 7 is a top plan view similar to FIG. 1 of a third alternative embodiment roofing membrane retainer according to even another aspect of the present invention.

FIG. 8 is a top plan view similar to FIG. 1 of a fourth alternative embodiment roofing membrane retainer according to yet even another aspect of the present invention.

FIG. 9 is a top plan view similar to FIG. 1 of a fifth alternative embodiment roofing membrane retainer according to yet another aspect of the present invention.

DETAILED DESCRIPTION OF THE PREFERRED EMBODIMENTS

Figure 5:
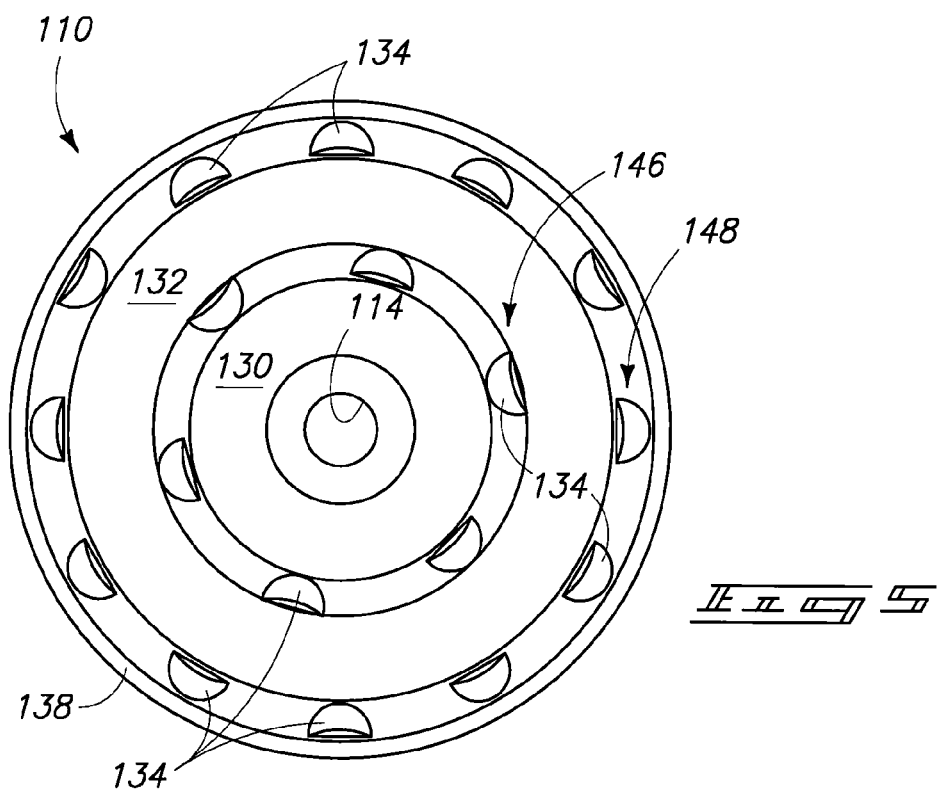
FIG. 5 is a top plan view similar to FIG. 1 of a first alternative embodiment roofing membrane retainer according to another aspect of the present invention.

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention comprising a roofing membrane retainer. While the invention is described by way of preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

FIG. 1 illustrates a retainer plate 10 for use in a roof decking membrane attachment system, according to one aspect of the present invention. As shown, retainer plate 10 is formed from a stamped sheet of metal material, such as GAL-VALUME®, a registered U.S. Trademark of BIEC International, Inc., of Vancouver, Wash. GALVALUME® is an aluminum-zinc coated steel. According to one construction, retainer plate 10 is stamped from a sheet of GALVALUME® sheet metal having a thickness in the range of 0.037-0.042 inches and a finished outer diameter of 2.375" diameter. Optionally, other materials, constructions, and thicknesses can be utilized. For example, steel, aluminum, metal alloy, composite or other suitable sheet materials can be used to form a retainer plate. According to such one construction, retainer plate 10 is stamped from a single sheet of material between a pair of coacting cutting dies.

Retainer plate 10 has a cylindrical outer periphery 12 and a central aperture 14 sized to receive a fastener 16 (see FIG. 4). In use, retainer plate 10 is secured via fastener 16 to retain a roofing membrane 18 atop an insulation panel 24 and a steel roof decking 22, after which another membrane 20 is adhesively secured there-atop using adhesive 26. According to one construction, membrane 18 has a taper 28 along a terminating edge.

As shown in FIG. 1, retainer plate 10 comprises a cylindrical plate having a cylindrical, central aperture 14 configured to receive a fastener, such as fastener 16 (see FIG. 4). Plate 10 has a cylindrical outer periphery 12 with a pair of concentric inner and outer raised reinforcing ribs 30 and 32, respectively. According to one construction, ribs 30 and 32 have a smooth, semi-cylindrical cross sectional geometry, as shown in FIG. 2. A plurality of scoop-shaped projections 34 are formed into plate 10 so as to extend downwardly from the plate in concentric inner and outer cylindrical arrays 46 and 48, respectively. Inner cylindrical array 46 of projections 34 and outer cylindrical array 48 of projections 34 are each positioned radially outward of inner rib 30 and outer rib 32, respectively. Furthermore, central aperture 14 is formed in the center of a cylindrical flat central portion 36, with rib 30 being formed immediately radially outward of central portion 36. Furthermore, an upturned outer peripheral edge 38 is formed immediately radially outboard of outer array 48.

Each projection 34 comprises a scoop having a base periphery with an open mouth edge 42 (see FIG. 3) and a remaining peripheral portion that is contiguous with the main body of plate 10. As shown in FIG. 1, projections 34 in arrays 46 and 48 are spaced substantially equidistant about plate 10. The mouth edges 42 (see FIG. 3) of adjacent projections 34 within an array are oriented in alternating radial inward and outward directions. Furthermore, for any selected group of three nearest neighbor projections from inner array 46, outer array 48, or both inner and outer arrays 46 and 48, the inner array 46 and the outer array 48 include at least one projection extending in a radially outward direction and at least another projection extending in a radially inward direction.

According to the construction depicted in FIG. 1, each projection 34 in outer array 48 is positioned with a center line axis orientation that is located angularly midway between a pair of adjacent projections 34 in inner array 46. More particularly, adjacent projections 34 in each circumferential array 46 and 48 are spaced apart 60 degrees. Adjacent projections from inner array 46 and outer array 48, respectively, are spaced apart 30 degrees from one array 46 to the other array 48.

As shown in FIGS. 1-3, each projection 34 comprises an axisymmetric shell segment that forms a downwardly extending eyelid-shaped projection. According to one construction, this projection is formed by a stamping operation between a pair of complementary dies. Alternatively, such a construction could be molded from any suitable structural material. More particularly, each of projections 34 comprises a severed conic section that is symmetric about a center axis extending in a radial direction, as shown in FIG. 1.

As shown in FIG. 2, inner reinforcing rib 30 and outer reinforcing rib 32 each comprise an upwardly projecting cylindrical groove having a semi-cylindrical cross-sectional profile. Alternatively, ribs can be constructed from some other suitable structural geometry having a hat-shaped, triangular-shaped, or other suitable structural cross-sectional configuration suitable for stiffening the roofing membrane retainer. As shown in FIGS. 2 and 3, free edges 42 on projections 34 within arrays 46 and 48 are formed during stamping so as to provide an opening, or slit 44 there along. Even though an opening 44 is provided there along, the smooth curve that defines free edge 42 ensures that there is no local, sharp pointed projection extending from plate 10 as a result of projections 34. Accordingly, the tendency for a roofing installer to cut or abrade their fingers while retrieving plates during a construction operation will be substantially reduced. Secondly, local stresses and cutting in a membrane are reduced when placed under failure-type loads as stresses are distributed more uniformly and over a larger local area as the eyelid-shaped projections increase contact surface area with the membrane which imparts local stretching of the membrane over a larger surface area. Furthermore, as shown in FIG. 2, an upturned outer peripheral edge 38 reduces the likelihood that a membrane might tear along the outer peripheral edge. Provision of a substantially flat cylindrical plate portion provided by central portion 36 around aperture 14 provides a base for securing a fastener there through.

FIG. 4 illustrates retainer plate 10 secured with a threaded fastener, or screw 16 through a lower membrane 18, an insulation panel 24, and a steel roof decking member 22. The view is taken along the same cutting line 2-2 depicted in FIG. 1. Screw 16 secures rigidly through steel decking member 22 which causes retainer plate 10 to urge into engagement with membrane 18. Individual projections 34 grip and compress membrane 18 locally thereof by way of arrays 46 and 48. Subsequently, adhesive 26 is applied atop membrane 18 and beneath overlapping membrane 20. A beveled edge 28 on membrane 18 further facilitates a smooth transition in the overlap region between membranes 18 and 20. Furthermore, adhesive 26 also forms along a terminating edge of membrane 20 and against membrane 18.

FIG. 5 illustrates a first alternative construction for a roofing membrane retainer plate 110 similar to retainer plate 10 depicted in FIGS. 1-5. Plate 110 is formed from stamped sheet steel, such as GALVALUME®. More particularly, retainer plate 110 has an inner array 146 and an outer array 148 of eyelid-shaped projections 134 similar to projections 34 in the embodiment depicted in FIGS. 1-4. However, array 148 has an increasing number of projections 134 over the outer array shown in the embodiment depicted in FIGS. 1-4. Specifically, array 148 has twice the number of projections 134 than the number of projections 34 found in array 48 (see FIG. 1). Additionally, projections 134 and array 148 do not alternate in radially inward and outward directions when progressing from one adjacent projection to the next projection. Instead, every fourth projection 134 and array 148 has an open mouth portion pointed in a radial outward direction with the remaining three intermediate projections having an open mouth portion pointed in a radially inward direction. Similar to the embodiment depicted in FIGS. 1-4, projections 134 within array 146 are oriented with a mouth edge of adjacent projections oriented in alternating radial inward and outward directions. Reinforcing ribs 130 and 132 are similar to ribs 30 and 32 (see FIG. 1) of the previous embodiment. Likewise, the central aperture 114 and an upturned outer peripheral edge 138 are similar to aperture 14 and upturned edge 38 (see FIG. 1) of the previous embodiment. Additionally, projections 134 within arrays 146 and 148 are aligned such that a projection within array 146 is positioned with a center line axis orientation located angularly midway between a pair of adjacent projections 134 in outer array 148.

Figure 6:
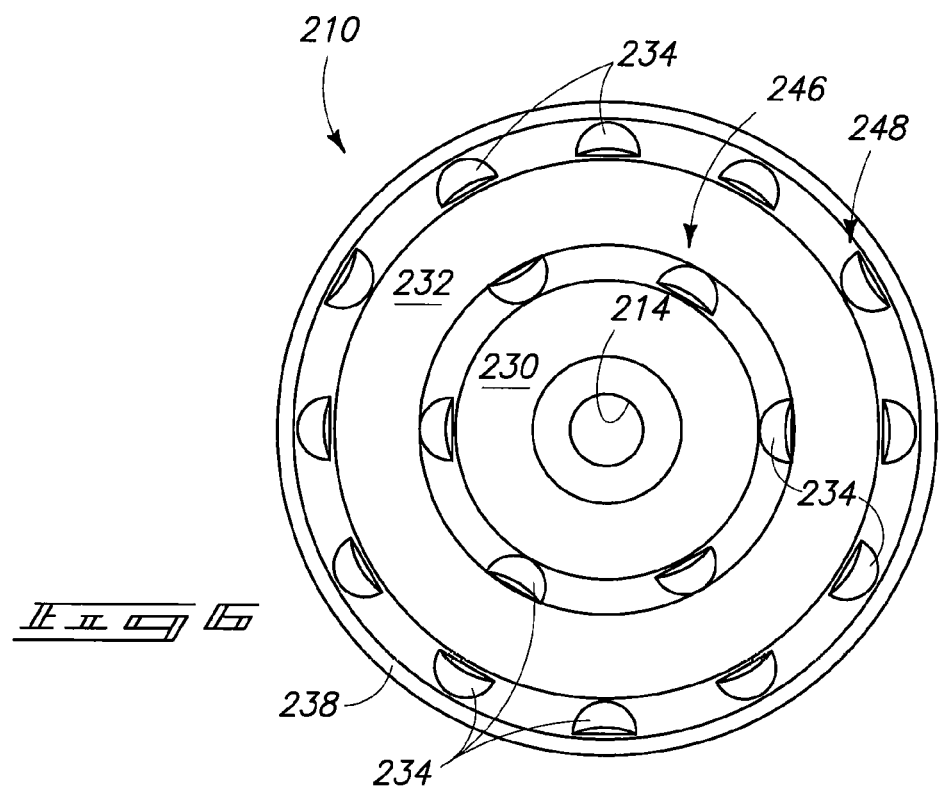
FIG. 6 is a top plan view similar to FIG. 1 of a second alternative embodiment roofing membrane retainer according to yet another aspect of the present invention.

FIG. 6 illustrates a second alternative construction for a roofing membrane retainer plate 210 similar to the constructions depicted for the embodiments of FIG. 1-4 and FIG. 5, respectively. More particularly, orientation of projections 234 within an outer array 248 are similar to projections 134 and array 148 (see FIG. 5). Every fourth projection has an open mouth portion that points in a radial outward direction with the remaining projections 234 pointing in a radially inward direction. Furthermore, there are the same number of projections within array 248 as there are within array 148 (see FIG. 5). Likewise, projections 234 within array 246 alternate in radially inward and outward directions. However, projections 234 within array 246 are positioned with a center line axis orientation that is located coincident with a projection 234 in outer array 248. The central aperture 214, an upturned outer peripheral edge 238, an inner raised reinforcing rib 230 and an outer raised reinforcing rib 232 are all similar to the respective aperture 114, peripheral edge 138, rib 30 and rib 32 depicted in the embodiment of FIG. 5 (as well as the embodiment depicted in FIGS. 1-4).

FIG. 7 illustrates a third alternative construction roofing membrane retainer plate 310 that is similar to the embodiment depicted in FIG. 1. The plurality of projections 343 are provided in an inner array 346 and an outer array 348. Array 348 is substantially the same as array 34 in the embodiment depicted in FIG. 1. However, array 346 differs from array 34 in embodiment FIG. 1. Individual projections 334 and array 346 have an open mouth portion and a central axis that extends a radial inward direction. Secondly, projections 334 and array 346 are positioned with a center line axis orientation located angularly midway between pairs of adjacent projections 334 and array 348. Central aperture 314, upturned outer peripheral edge 338, inner raised reinforcing rib 330 and outer raised reinforcing rib 332 are essentially the same as respective portions depicted in the embodiment of FIG. 1.

FIG. 8 illustrates a fourth alternative construction for a roofing membrane retainer plate 410. Retainer plate 410 is similar to plate 310 (see FIG. 7). However, projections 434 in an outer array 448 are all oriented with an open mouth portion that extends in a radial inward direction. Similarly, projections 434 in an inner array 446 are all configured with an open mouth portion that extends in a radial inward direction, similar to the corresponding construction depicted in FIG. 7. A central aperture 414, an upturned outer peripheral edge 438, an inner raised reinforcing rib 430 and an outer raised reinforcing rib 432 are all similar to the respective components provided in reinforcing plate 310 of FIG. 7.

FIG. 9 illustrates a fifth alternative construction for a roofing membrane retainer plate 510. Retainer plate 510 is similar to retainer plate 410, except selected ones of projections 534 are rotated slightly off center and do not have an open mouth portion with a central axis that extends in a radial inward direction. For example, projections 534 within an outer array 548 include projections having an open mouth portion that extends in a radial inward direction; namely, projections that are located at a twelve o'clock and six o'clock position, as seen in FIG. 9. However, projections located at a two o'clock, four o'clock, eight o'clock, and ten o'clock position are provided with an open mouth portion and a central axis that is tilted approximately 30 degrees from a radial direction. Similarly, selected projections 534 within an inner array 546 are also tilted such that the longitudinal direction defined by the open mouth portion does not extend in a radial inward direction. More particularly, selected projections 534 within inner array 546 located at the three o'clock and nine o'clock positions have an open mouth portion with a longitudinal axis that extends in a radial inward direction. However, projections at the one o'clock, five o'clock, seven o'clock and eleven o'clock positions are rotated with an open mouth portion and a longitudinal axis that is tilted approximately 30 degrees from a radial inward direction. A central aperture 514, an upturned outer peripheral edge 538, an inner raised reinforcing rib 530 and an outer raised reinforcing rib 532 are essentially the same as the respective components depicted in the retainer plate 410 of FIG. 8.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A roofing membrane retainer, comprising:
    a cylindrical plate having a central aperture for receiving a fastener, the plate having:
        a pair of concentric inner and outer raised reinforcing ribs; and
        plurality of scoop-shaped projections extending downwardly from the plate in concentric inner and outer cylindrical arrays;
        wherein the inner cylindrical array of projections and the outer cylindrical array of projections are radially outward of the inner rib and the outer rib, respectively; and
        wherein the projections each comprise a scoop with a base periphery having an open mouth edge and a remaining peripheral portion contiguous with the plate, the projections in each array spaced equidistant about the plate, and with the mouth edge of adjacent projections oriented in alternating radial inward and outward directions.

2. The roofing membrane retainer of claim 1, wherein the inner reinforcing rib and the outer reinforcing rib each comprise an upwardly projecting cylindrical groove.

3. The roofing membrane retainer of claim 2, wherein each of the inner groove and the outer groove has a semi-cylindrical cross-sectional profile.

4. The roofing membrane retainer of claim 1, wherein each of the projections comprises an axisymmetric shell segment.

5. The roofing membrane retainer of claim 4, wherein the axisymmetric shell segment is an eyelid-shaped projection.

6. The roofing membrane retainer of claim 1, wherein any selected group of three nearest neighbor projections from the inner array, the outer array, or both the inner array and the outer array includes at least one projection extending in a radial outward direction and at least another projection extending in a radial inward direction.

7. The roofing membrane retainer of claim 1, wherein each projection in the outer array is positioned with a centerline axis orientation located angularly midway between a pair of adjacent projections in the inner array.

8. The roofing membrane retainer of claim 1, wherein each of the projections comprises a severed conic section that is symmetric about a center axis extending in a radial direction.

9. A roofing membrane seam plate, comprising:
    a plate having a closed curve outer periphery with a central aperture sized to receive a fastener, the plate including:
        a pair of circumferentially extending inner and outer raised reinforcing ribs; and
        a plurality of obtuse projections extending downwardly from the plate in inner and outer circumferential arrays, each projection including a scoop with a peripheral portion contiguous with the plate and an open mouth edge separated from the plate, the inner circumferential array of projections and the outer circumferential array of projections provided radially outward of the inner rib and the outer rib, respectively, the projections in each array spaced equidistant about the plate, and the mouth edge of adjacent projections within the inner array and the outer array oriented in alternating radial inward and outward directions.

10. The seam plate of claim 9, wherein the plate is a cylindrical plate having an upturned outer peripheral edge portion and the inner and outer reinforcing ribs are concentric.

11. The roofing membrane retainer of claim 9, wherein the inner and outer circumferential arrays each comprise a cylindrical array.

12. The roofing membrane retainer of claim 9, wherein the projections in the inner array and the outer array are oriented with the mouth edge of adjacent projections within each array oriented in alternating radial inward and outward directions.

13. The roofing membrane retainer of claim 9, wherein each projection comprises an axisymmetric shell segment forming a downwardly extending eyelid-shaped projection.

14. The roofing membrane retainer of claim 9, wherein the reinforcing ribs are each cylindrical, and each projection in the outer array is positioned with a centerline axis orientation located angularly midway between a pair of adjacent projections in the inner array.

15. The seam plate of claim 9, wherein adjacent projections in each circumferential array are spaced apart 60 degrees, and adjacent projections from the inner array and the outer array, respectively, are spaced apart 30 degrees.

16. The roofing membrane retainer of claim 15, wherein each scoop forms an eyelid-shaped shell having an open mouth edge.

17. The seam plate of claim 9, wherein any selected group of three nearest neighbor projections from the inner array, the outer array, or both the inner array and the outer array includes at least one projection extending in a radial outward direction and at least another projection extending in a radial inward direction.

18. A roofing membrane retainer, comprising:
    a plate having a central aperture for receiving a fastener, the plate having:
        a pair of concentric inner and outer raised reinforcing ribs; and
        a plurality of scoop-shaped projections extending downwardly from the plate in concentric inner and outer circumferential arrays;
        wherein the inner circumferential array of projections and the outer circumferential array of projections are radially outward of the inner rib and the outer rib, respectively; and
        wherein the projections each comprise a scoop with a base periphery having an open mouth edge and a remaining peripheral portion contiguous with the plate, the projections in each array spaced equidistant about the plate, and with the mouth edge of at least three adjacent projections in each array oriented in alternating radial inward and outward directions.

19. The roofing membrane retainer of claim 18, wherein the plate comprises a round plate with concentric inner and outer cylindrical arrays of projections.

20. The roofing membrane retainer of claim 18, wherein each of the scoops comprises a symmetric scoop having an axis of symmetry extending in a radial direction.

21. A roofing membrane retaining washer, comprising:
    a cylindrical plate with a central aperture configured to receive a fastener, the plate further including:
        an inner reinforcing rib;
        an outer reinforcing rib;

a plurality of projections each comprising a scoop-shaped projection formed contiguously with the plate and having a free edge separated from the plate, each projection extending downwardly from the plate and configured in concentric inner and outer cylindrical arrays, each projection comprising a free-edge axisymmetric three dimensional curved shell structure; and an upturned outer peripheral edge portion.

22. The roofing membrane retainer of claim 21, wherein the axisymmetric shell segment is an eyelid-shaped projection.

23. The roofing membrane retainer of claim 21, wherein any selected group of three nearest neighbor projections from the inner array, the outer array, or both the inner array and the outer array includes at least one projection extending in a radial outward direction and at least another projection extending in a radial inward direction.

24. A roofing membrane retaining washer, comprising:
a cylindrical plate with a central aperture configured to receive a fastener, the plate further including:
an inner reinforcing rib;
an outer reinforcing rib;
a plurality of projections each extending downwardly from the plate and configured in concentric inner and outer cylindrical arrays, each projection comprising a free-edge axisymmetric three dimensional curved shell structure; and
an upturned outer peripheral edge portion;
wherein the inner reinforcing rib and the outer reinforcing rib each comprise a cylindrical groove having a semi-cylindrical cross section.

25. The roofing membrane retainer of claim 24, wherein the projections in each of the inner and outer cylindrical arrays are spaced equidistant about the plate.

26. The roofing membrane retainer of claim 24, wherein each projection in the outer array is positioned with a center-line axis orientation located angularly midway between a pair of adjacent projections in the inner array.

27. A roofing membrane retaining washer, comprising:
a cylindrical plate with a central aperture configured to receive a fastener, the plate further including:
an inner reinforcing rib;
an outer reinforcing rib;
a plurality of projections each extending downwardly from the plate and configured in concentric inner and outer cylindrical arrays, each projection comprising a free-edge axisymmetric three dimensional curved shell structure; and
an upturned outer peripheral edge portion;
wherein the inner reinforcing rib and the outer reinforcing rib are concentric.

28. The roofing membrane retainer of claim 27, wherein each of the free-edge axisymmetric shell structures comprises a severed conic section that is symmetric about a center axis extending in a radial direction.

29. The roofing membrane retainer of claim 27, wherein any selected group of three nearest neighbor projections from the inner array, the outer array, or both the inner array and the outer array includes at least one projection extending in a radial outward direction and at least another projection extending in a radial inward direction.

* * * * *